March 6, 1962 P. B. ZEIGLER ET AL 3,024,039
UNITIZED SLIDING PILLAR REAR SUSPENSION
Filed Oct. 27, 1960 2 Sheets-Sheet 1

INVENTORS
Philip B. Zeigler &
BY Robert L. White
W. F. Wagner
ATTORNEY

INVENTORS
Philip B. Zeigler &
BY Robert L. White
W. F. Wagner
ATTORNEY

United States Patent Office 3,024,039
Patented Mar. 6, 1962

3,024,039
UNITIZED SLIDING PILLAR REAR SUSPENSION
Philip B. Zeigler and Robert L. White, Saginaw, Mich., assignors to General Motors Corporation, Detroit, Mich., a corporation of Delaware
Filed Oct. 27, 1960, Ser. No. 65,457
5 Claims. (Cl. 280—106.5)

This invention relates to vehicle suspension and more particularly to sliding pillar suspension for vehicle driving wheels.

An object of the invention is to provide an improved vehicle suspension.

Another object is to provide a sliding pillar independent wheel mounting for vehicle driving wheels.

A further object is to provide a suspension of the stated character which substantially reduces lateral wheel scrub incident to vertical deflection of the sprung mass of the vehicle.

A still further object is to provide a sliding pillar independent wheel suspension in which the pillar moves through an arc, the center of which is located outboard of the opposite wheel.

A still further object is to provide a suspension of the type described utilizing a splined pillar supported in recirculating ball guide means.

Yet a further object is to provide an arrangement of the stated character which is compact, rugged, and easily assembled and disassembled.

These and other objects, advantages and features of the invention will become more fully apparent as reference is had to the accompanying specification and drawings wherein.

Figure 1:
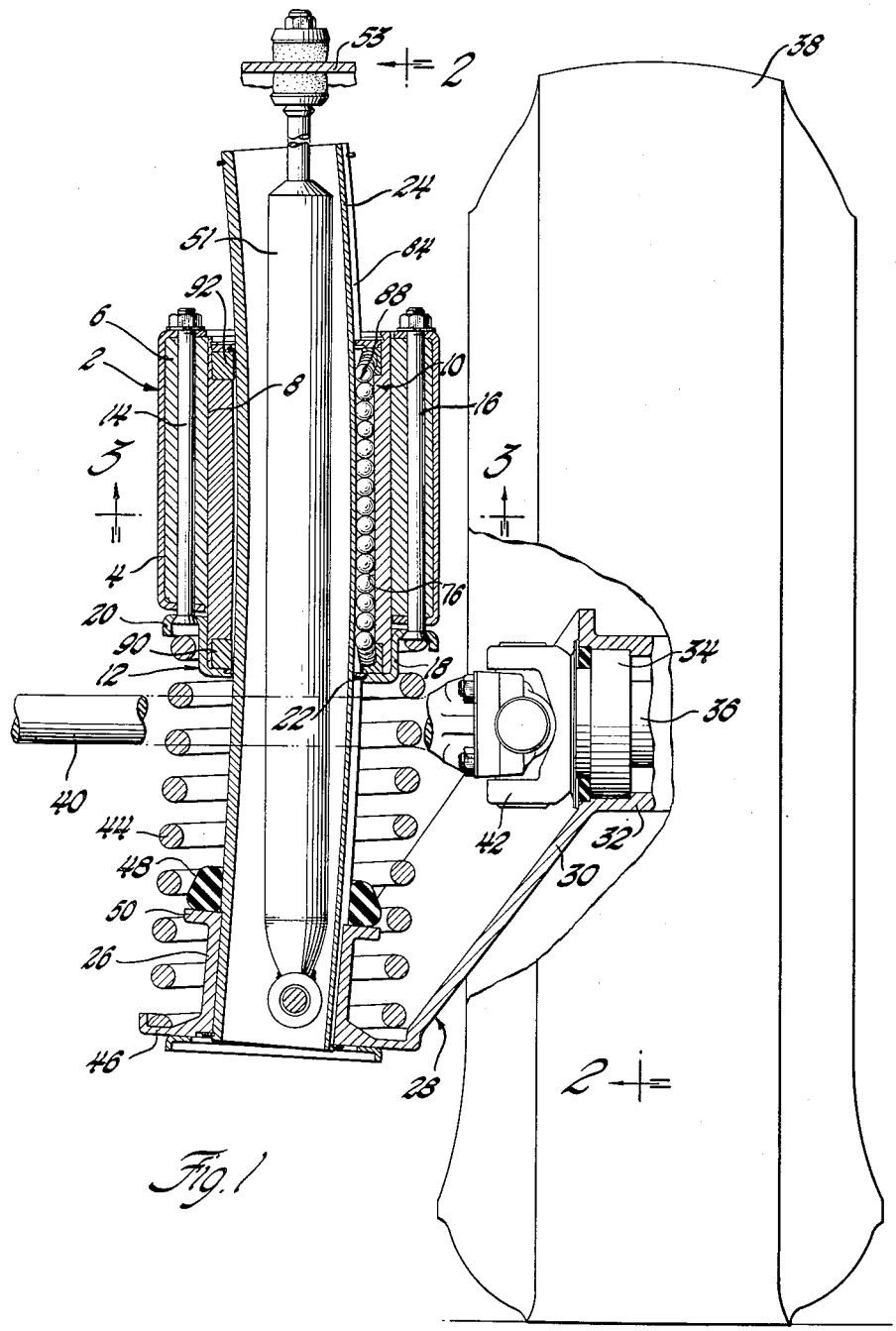
FIG. 1 is a front elevational view, partly in section and with parts broken away, illustrating a sliding pillar independent wheel suspension in accordance with the invention.
Figure 2:
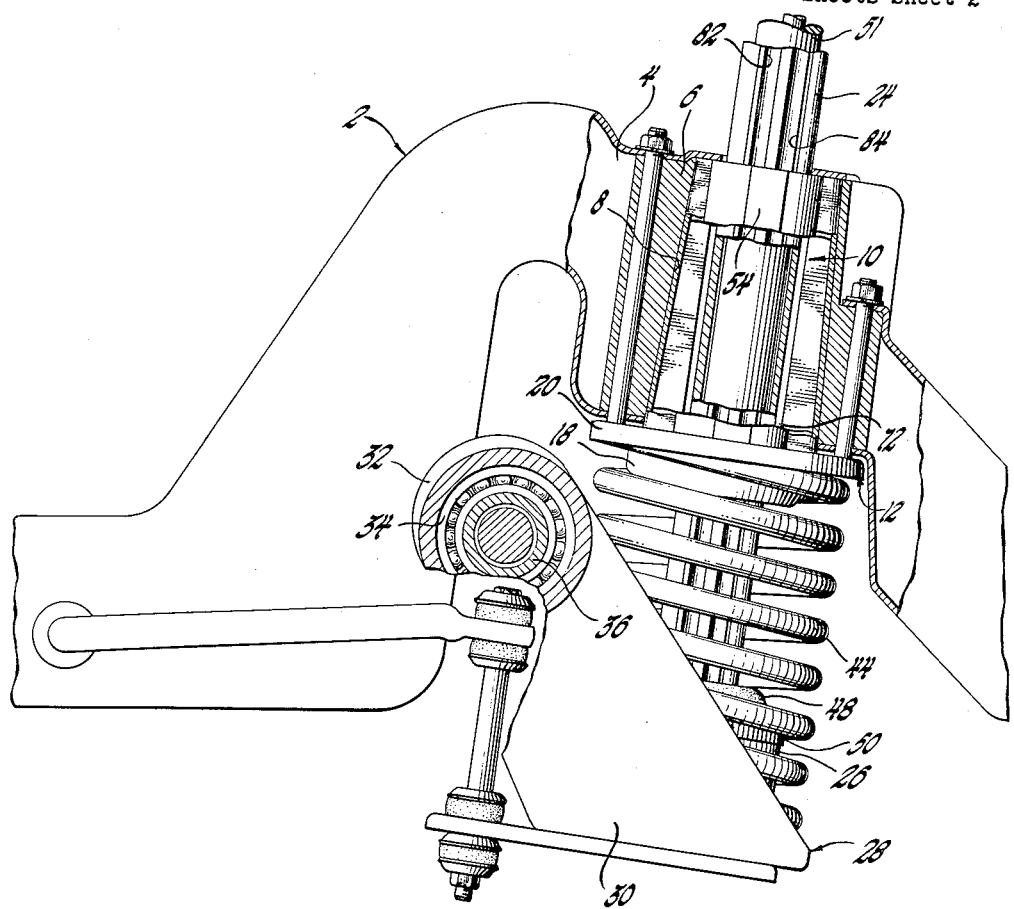
FIG. 2 is a side elevational view, partly in section and with parts broken away, looking in the direction of arrows 2—2 of FIG. 1.

Referring now to the drawings and particularly FIGS. 1 and 2, there is illustrated an independent wheel suspension structure in which the reference numeral 2 designates a box section longitudinally extending frame side rail. It will be understood that a similar frame side rail is located laterally of rail 2 at the opposite side of the vehicle and that the suspension of the opposite wheel, not shown, is identical to that illustrated and to which the following description applies. Disposed within the hollow portion 4 of side rail 2 is a generally box-like forged or cast support 6 having a generally elliptical vertical bore 8 formed therein which is adapted to receive a split generally tubular bearing housing 10. Support 6 is preferably installed during the frame forming operations so as to become a permanent fixed part thereof. As seen best in FIG. 2, bore 8 of support 6 is tapered vertically in side elevation, while bearing housing 10 is similarly tapered so that upon assembly thereof application of an upward force on the latter produces wedge locking engagement with the former. In the embodiment shown, upward force is applied by plate 12 and bolts 14 and 16. As seen best in FIG. 1, plate 12 has a central depressed portion 18 in which the base of bearing housing 10 is seated. Plate 12 is formed with a peripheral flange 20 through which bolts 14 and 16 extend upwardly for connection with frame 2 and support 6. Vertically reciprocable within bearing support 10 and extending through an aperture 22 in plate 12 is a hollow pillar 24 which is arcuate as viewed in front elevation. The lower end of pillar 24 extends into and is secured to the vertical hub portion 26 of a forged wheel supporting member 28. Supporting member 28 includes an upwardly and outwardly inclined arm portion 30, the outer end of which is formed with a horizontal hub 32. Hub 32 has bearings 34 mounted therein which rotatably support a spindle 36 and vehicle wheel 38 attached thereto. As seen best in FIG. 2, the outer end of arm portion 30 is also inclined forwardly of the vertical axis of pillar 24 so as to provide clearance for oscillatory movement of driving half axle 40 which is connected to wheel spindle 36 by a universal joint 42.

In order to resiliently support frame 2 and associated sprung mass of the vehicle relative to wheel 38, a coil spring 44 is disposed around the lower end of pillar 24 between plate 12 and the bottom flange 46 of wheel support hub portion 26. To provide for resilient arresting of excessive compression movement of wheel 38, an annular resilient bump stop 48 surrounds pillar 24 and rests on the top flange 50 of hub portion 26. It will be apparent that bump stop 48 will engage plate 12 after predetermined upward movement of wheel 38. A conventional hydraulic shock absorber 51 is disposed in the hollow interior of pillar 24 and has its opposite ends connected to hub 26 and a suitable portion 53 of the sprung mass.

Figure 3:
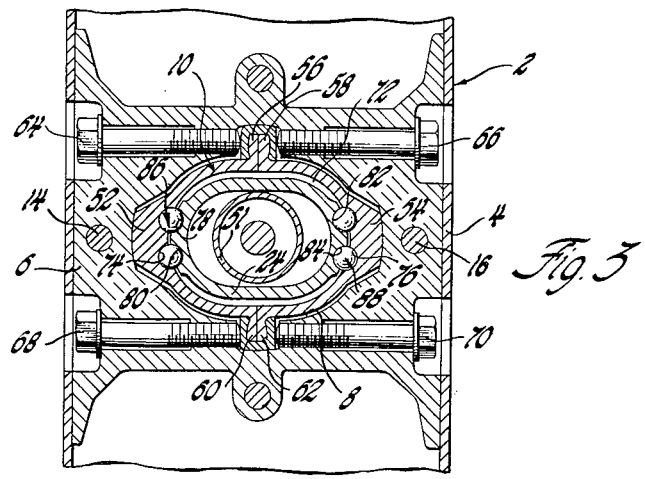
FIG. 3 is a fragmentary enlarged sectional plan view, looking in the direction of arrows 3—3 of FIG. 1.

As seen best in FIG. 3, bearing housing 10 is formed of reversely similar half sleeves 52 and 54 having vertically abutting ribs 56, 58 and 60, 62 which are drawn into clamped relation by bolts 64, 66 and 68, 70 extending horizontally through support 6. When in assembled relation, sleeves 52 and 54 form a generally elliptical vertically extending aperture 72 having "race track" grooves 74 and 76 formed therein which are aligned with parallel grooves 78, 80 and 82, 84 extending the length of arcuate pillar 24. It will be understood that the lateral inner faces of sleeves 52 and 54 are generated in arcs corresponding with the arcuate form of pillar 24 and that the race track grooves 74 and 76 are therefore also arcuate as viewed in the front elevation (FIGURE 1). Each of the race track grooves 74 and 76 is filled with a train of balls 86 and 88 which provide anti-friction bearing engagement with the adjacent parallel grooves 78, 80 and 82, 84. Removable end closures 90 and 92 form a part of bearing housing 10 and permit initial installation of the ball trains.

From observation of FIG. 1, it will be evident that vertical deflection of wheel 38 will take place in an arcuate path, the center of which is located a substantial distance toward the lateral opposite side of the vehicle. This distance is preferably at least one and one half times the track width between the opposite wheels. Because of the considerable length of the effective lever arm for each wheel, lateral movement of the portion of the wheel in contact with the ground is minimized and therefore tire scrub is greatly reduced, if not totally eliminated.

In addition to the features already noted, in the prevent construction the entire sliding pillar assembly is mounted so that vertical movement thereof occurs along a vertical path which causes the wheel to move rearwardly as it moves upwardly. As seen best in FIG. 2, this is accomplished by mounting the support 6 within frame side rail 2 so that the vertical axis of pillar 24 is inclined rearwardly and upwardly. Because of this inclination, a substantial anti-squat component is derived in a known manner which offsets weight transfer toward the rear of the vehicle during acceleration.

From the foregoing it will be seen that a novel and improved rear wheel suspension has been provided. It will be particularly noted that a suspension in accordance with the present invention is located entirely in the narrow lateral range occupied by the frame side rail thereby allowing greater freedom of design since the vehicle underbody area between the side rails is completely unobstructed by suspension components.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. Independent wheel suspension comprising a frame member having a box-like support encased therein, said support including a vertically tapered generally elliptical passage extending therethrough, a generally elliptical tubular bearing housing fixedly disposed in said passage, a generally elliptical tubular pillar reciprocable disposed in said bearing housing, recirculating ball anti-friction means disposed between said housing and tubular pillar, a wheel supporting member secured to one end of said pillar, a coil spring surrounding said pillar and extending between said frame and said supporting member, the portions of said pillar and said bearing housing engaging said recirculating ball means being arcuate in form as viewed in front elevation.

2. The structure set forth in claim 1 wherein the major cross-sectional dimension of each of said elliptically shaped members extends transversely of the vehicle.

3. Independent wheel suspension for a vehicle comprising a frame member having a box-like support encased therein, said support including a vertically tapered passage extending therethrough, a tubular bearing housing fixedly disposed in said passage, a tubular pillar reciprocably disposed in said bearing housing, recirculating ball anti-friction means disposed between said housing and tubular pillar, a wheel supporting member secured to one end of said pillar, a wheel rotatably mounted on said supporting member, a coil spring surrounding said pillar and extending between said frame and said supporting member, the portions of said pillar and said bearing housing engaging said recirculating ball means being arcuate in form as viewed in front elevation, and said arcuate form generates from an imaginary point located outboard of the opposite side of said vehicle.

4. The structure set forth in claim 3 including a telescoping shock absorber contained within said pillar.

5. The structure set forth in claim 4 wherein said pillar, bearing housing and support are inclined in side elevation so that said wheel moves rearwardly and upwardly during compression deflection.

References Cited in the file of this patent

UNITED STATES PATENTS

| | | |
|---|---|---|
| 2,563,370 | Reese | Aug. 7, 1951 |
| 2,760,783 | Keith | Aug. 28, 1956 |
| 2,967,066 | Mueller | Jan. 3, 1961 |